US011176521B2

(12) United States Patent
Jones et al.

(10) Patent No.: US 11,176,521 B2
(45) Date of Patent: *Nov. 16, 2021

(54) CONFIDENTIALITY MANAGEMENT OF E-MAIL USERS IN REDISTRIBUTED E-MAIL MESSAGES

(71) Applicant: INTERNATIONAL BUSINESS MACHINES CORPORATION, Armonk, NY (US)

(72) Inventors: Angela Richards Jones, Durham, NC (US); Ruthie D. Lyle, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 58 days.

This patent is subject to a terminal disclaimer.

(21) Appl. No.: 16/659,309

(22) Filed: Oct. 21, 2019

(65) Prior Publication Data
US 2020/0051032 A1 Feb. 13, 2020

Related U.S. Application Data

(63) Continuation of application No. 11/840,775, filed on Aug. 17, 2007, now Pat. No. 10,453,034.

(51) Int. Cl.
G06Q 10/10 (2012.01)

(52) U.S. Cl.
CPC .................. G06Q 10/107 (2013.01)

(58) Field of Classification Search
CPC ... G06Q 10/107; G06F 15/16; H04L 61/1564; H04L 47/33; H04L 51/24; H04L 41/0686;
(Continued)

(56) References Cited

U.S. PATENT DOCUMENTS 6,480,884 B1 11/2002 Saito
7,120,670 B2 10/2006 Aikawa
(Continued)

FOREIGN PATENT DOCUMENTS

JP 2005094512 A * 4/2005 ............. H04L 12/58
JP 2005094512 A 4/2005

OTHER PUBLICATIONS

U.S. Appl. No. 11/840,775, Non-Final Office Action, dated Aug. 7, 2009, 27 pg.
(Continued)

Primary Examiner — Joseph L Greene
(74) Attorney, Agent, or Firm — Cuenot, Forsythe & Kim, LLC

(57) ABSTRACT

Embodiments of the present invention address deficiencies of the art in respect to instant messaging and provide a novel and non-obvious method, system and computer program product for managing e-mail user confidentiality. In one embodiment of the invention, a method for managing e-mail user confidentiality can be provided. The method can include transmitting an e-mail message for delivery to multiple e-mail users and corresponding e-mail addresses, identifying a privacy preference for a particular one of the e-mail users; and, concealing a display within the e-mail message of an e-mail address associated with the particular one of the e-mail users responsive to the privacy preference.

15 Claims, 2 Drawing Sheets

(58) Field of Classification Search
CPC .......... H04L 41/0627; H04N 21/4786; H04N 21/13375; H04Q 2213/13375; H04M 15/86; H04M 2215/8129
See application file for complete search history.

(56) References Cited

U.S. PATENT DOCUMENTS

| | | |
|---|---|---|
| 7,231,427 B1 | 6/2007 | Du |
| 7,293,171 B2 | 11/2007 | Batthish |
| 10,453,034 B2 | 10/2019 | Jones et al. |
| 2002/0002590 A1 | 1/2002 | King |
| 2003/0105823 A1 | 6/2003 | Ally |
| 2004/0025057 A1 | 2/2004 | Cook |
| 2004/0064513 A1 | 4/2004 | Andaker |
| 2004/0148356 A1 | 7/2004 | Bishop |
| 2004/0193692 A1 | 9/2004 | Bottan |
| 2004/0267625 A1* | 12/2004 | Feng .............. G06F 3/0484 715/733 |
| 2005/0108351 A1* | 5/2005 | Naick .............. G06Q 10/107 709/207 |
| 2005/0160292 A1 | 7/2005 | Batthish |
| 2005/0182767 A1 | 8/2005 | Shoemaker |
| 2006/0143068 A1 | 6/2006 | Calabria |
| 2006/0224675 A1 | 10/2006 | Fox |
| 2006/0235930 A1 | 10/2006 | Thurlow |
| 2007/0271336 A1 | 11/2007 | Ramaswamy |
| 2008/0005355 A1 | 1/2008 | Craft |
| 2008/0010348 A1 | 1/2008 | Dawson |
| 2008/0021962 A1* | 1/2008 | Ryan .............. G06Q 10/107 709/206 |
| 2009/0006851 A1 | 1/2009 | Freeman |
| 2009/0049142 A1 | 2/2009 | Jones et al. |
| 2010/0023585 A1 | 1/2010 | Nersu |

OTHER PUBLICATIONS

U.S. Appl. No. 11/840,775, Final Office Action, dated Mar. 9, 2010, 34 pg.
U.S. Appl. No. 11/840,775, Examiner's Answer to Appeal Brief, Jan. 5, 2011, 43 pg.
U.S. Appl. No. 11/840,775, Patent Board Decision on Appeal, Feb. 3, 2014, 6 pg.
U.S. Appl. No. 11/840,775, Non-Final Office Action, dated Mar. 26, 2015, 10 pg.
U.S. Appl. No. 11/840,775, Final Office Action, dated Oct. 15, 2015, 14 pg.
U.S. Appl. No. 11/840,775, Non-Final Office Action, dated Aug. 12, 2016, 12 pg.
U.S. Appl. No. 11/840,775, Final Office Action, dated Feb. 28, 2017, 16 pg.
U.S. Appl. No. 11/840,775, Non-Final Office Action, dated Oct. 5, 2017, 17 pg.
U.S. Appl. No. 11/840,775, Final Office Action, dated Apr4. 20, 2018, Final Office Action, 19 pg.
U.S. Appl. No. 11/840,775, Non-Final Office Action, dated Jan. 11, 2019, 13 pg.
U.S. Appl. No. 11/840,775, Notice of Allowance, dated Jun. 12, 2019, 7 pg.
U.S. Appl. No. 11/840,775, Corrected Notice of Allowability, dated Sep. 11, 2019, 2 pg.

* cited by examiner ered e-mail addresses, and routing the e-mail message to the e-mail users. Alternatively, transmitting an e-mail message for delivery to multiple e-mail users
CONFIDENTIALITY MANAGEMENT OF E-MAIL USERS IN REDISTRIBUTED E-MAIL MESSAGES

BACKGROUND OF THE INVENTION

Field of the Invention

The present invention relates to the field of electronic messaging and more particularly to managing e-mail address confidentiality in an e-mail message.

Description of the Related Art

A variety of electronic messaging systems have arisen which range from real-time instant messaging systems and wireless text pagers to asynchronous electronic mail systems. Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties.

E-mail applications allow users to compose and send e-mail to different users, in addition to forwarding e-mails that have been received to other designated recipients. It is common for e-mails to be redistributed several times to many different recipients. As such, there may be times when a user intends to conceal the e-mail address of the sender but not the content of a message when forwarding an e-mail. Likewise, a recipient of a mass-distributed e-mail may not find comfort in others viewing the e-mail address of the recipient in the addressable fields of the mass-distributed e-mail—especially when the others are not known personally to the recipient.

Conventional methods of concealing the identity of an e-mail addressee include protecting the identity of the sender by manually removing the original name of the sender and e-mail address of the sender from the body of the e-mail before redistributing the e-mail. Also, to protect the identity of the recipient, every e-mail address for a corresponding recipient can be manually placed in the blind carbon copy (BCC) address field instead of the "TO" field. Still, conventional concealment methods place the fate of the identity protection of a designated recipient in the hands of the sender.

Consequently, if the sender chooses not to respect the privacy of a designated recipient in connection with an e-mail message, then the identity of the designated recipient will be revealed to all recipients of the e-mail message. Thus, the original sender and the potential recipients of a redistributed e-mail have no control over identity protection. Further, though users enjoy the option of manually deleting or hiding e-mail addresses, current methods of redistributing e-mails and protecting identities of users can most times be manually cumbersome since there is no automated process of pro-actively preventing exposure of user e-mails in a redistributed e-mail.

BRIEF SUMMARY OF THE INVENTION

Embodiments of the present invention address deficiencies of the art in respect to real-time instant messaging and provide a novel and non-obvious method, system and computer program product for managing e-mail user confidentiality. In one embodiment of the invention, a method for e-mail user confidentiality management can be provided. The method can include transmitting an e-mail message for delivery to multiple e-mail users and corresponding e-mail addresses, identifying a privacy preference for a particular one of the e-mail users and concealing within the e-mail message a display of an e-mail address associated with the particular one of the e-mail users responsive to the privacy preference.

In one aspect of the embodiment, transmitting an e-mail message for delivery to multiple e-mail users and corresponding e-mail addresses can include composing an e-mail message, retrieving an e-mail address for each of the e-mail users from a directory, populating an address field of the e-mail message with the e-mail addresses, and routing the e-mail message to the e-mail users. Alternatively, transmitting an e-mail message for delivery to multiple e-mail users and corresponding e-mail addresses can include selecting a previously received e-mail message, retrieving an e-mail address for each of a plurality of e-mail users from a directory, populating an address field of a forwarded form of the previously received e-mail message with the retrieved e-mail addresses, and routing the forwarded form of the previously received e-mail message to the e-mail users.

In another aspect of the embodiment, identifying a privacy preference for a particular one of the e-mail users can include looking up a privacy preference for the particular one of the e-mail users in a directory of e-mail users and corresponding e-mail addresses. In yet another aspect of the embodiment, identifying a privacy preference for a particular one of the e-mail users further can include comparing the e-mail users designated for the e-mail message with members of a social network of the particular one of the e-mail users, and determining a privacy preference based upon a threshold number of the e-mail users also belonging to the social network. Finally, in even yet a further aspect of the embodiment, identifying a privacy preference for a particular one of the e-mail users further can include comparing the e-mail users designated for the e-mail message with e-mail users in a list, for example a lightweight directory access protocol (LDAP) directory or an instant messaging (IM) buddy list. Thereafter, a privacy preference can be determined based upon a threshold number of the e-mail users appearing in the list.

In another embodiment of the invention, a system for managing e-mail user confidentiality can be provided. The system can include a messaging client, a directory of e-mail users and corresponding e-mail addresses, and a confidentiality processor coupled to the messaging client. The confidentiality processor can be programmed to respond to a request to transmit an e-mail message for delivery to multiple e-mail users, to identify a privacy preference for a particular one of the e-mail users in the directory of e-mail users, and to conceal a display of an e-mail address associated with the particular one of the e-mail users responsive to the privacy preference.

In another aspect of the embodiment, designating an e-mail message for delivery to multiple e-mail users and corresponding e-mail addresses can include composing or redistributing an e-mail message and populating an address field with e-mail addresses from a directory of e-mail users and corresponding e-mail addresses.

In yet another aspect of the embodiment, identifying a privacy preference for a particular e-mail user can include looking up that particular user's e-mail address in a directory of e-mail users and corresponding e-mail addresses, and optionally determining that particular user's social network, and establishing a rule to govern the privacy preference for that particular e-mail user In another aspect of the embodiment, a system for managing confidentiality of an e-mail user can be provided. The system can include a messaging client, a directory of e-mail users and corresponding e-mail addresses, and a confidentiality processor coupled to the messaging client and programmed to respond to a request to designate an e-mail message for delivery to multiple e-mail users, identify a privacy preference for each e-mail user from the directory of e-mail users, and conceal the display of an e-mail address associated with an e-mail user responsive to the privacy preference.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for e-mail address confidentiality management. In accordance an embodiment of the invention, a set of e-mail clients in a messaging network can be configured to process e-mail address confidentiality for a particular e-mail user. Specifically, the confidentiality processor can specify a set of designated e-mail users for an associated e-mail message and the privacy preferences afforded to those particular e-mail users in transmitting the associated e-mail message. As such, when the e-mail message is received by a designated recipient, the display of e-mail addresses associated with those particular e-mail users can be concealed by the messaging client.

Figure 1:
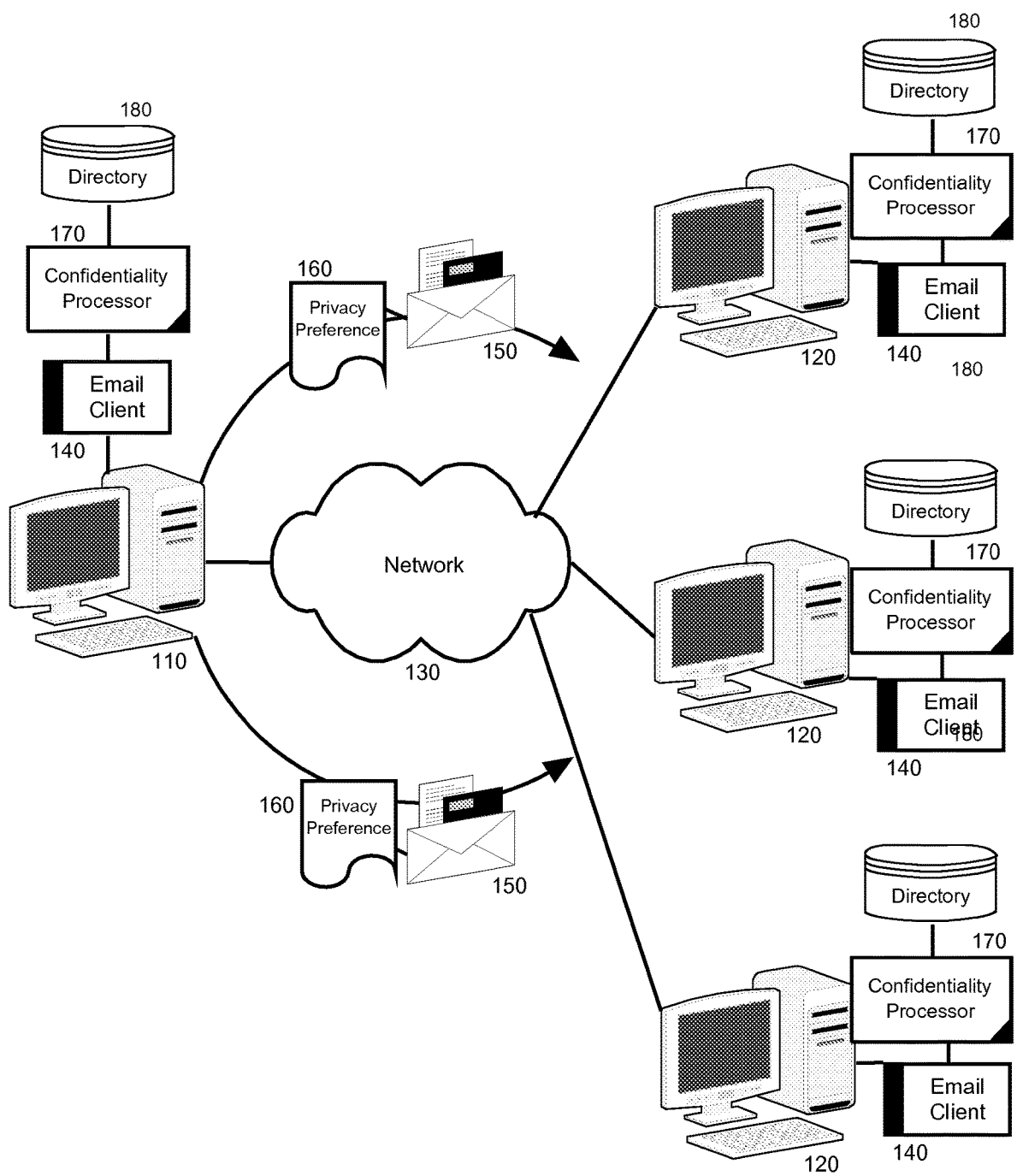
FIG. 1 is a schematic illustration of an e-mail messaging data processing system configured for e-mail address confidentiality management.

In further illustration, FIG. 1 is a schematic illustration of an e-mail management data processing system configured for e-mail address confidentiality management. The system can include a host platform 110 coupled to one or more client computing devices 120 over data communications network 130. The host platform 110 can support the operation of an e-mail messaging client 140 programmed to create, edit, transmit and receive electronic messages 150 including e-mail messages. Likewise, each of the client computing devices 120 can support an e-mail messaging client 140 configured to create, edit, transmit and receive electronic messages 150 including e-mail over the data communications network 130.

Importantly, each of the e-mail messaging clients 140 can be coupled to a confidentiality processor 170. The confidentiality processor 170 can include program code enabled to process privacy preferences 160 associated with the electronic messages 150. Each of the privacy preferences 160 can specify a designated sender and one or more recipients for an electronic message 150. Each of the privacy preferences 160 further can specify a set of limitations pertaining to the ability of an e-mail user to conceal their own e-mail address in an electronic message 150. The privacy preferences 160 can be stored in a directory 180 and stored in association with e-mail addresses with each being associated with a particular e-mail user. For example, the directory 180 can include an address book, an enterprise LDAP directory, or an IM buddy list.

The limitations of the privacy preferences 160 can provide rules to determine whether or not to conceal the e-mail address of either a sender or a receiver of the electronic message 150. The rules can include, for example, rules determining confidentiality based upon an express preference for confidentiality for a designated recipient of the electronic message 150, whether a subsequent forwarder of the electronic message 150 has a particular identity, whether a threshold number of designated recipients of the electronic message 150 belong to a social network in common with the sender or receiver of associated with the e-mail address, or when the electronic message 150 is forwarded to an additional number of designated recipients, whether a threshold number of designated recipients of the electronic message 150 belong to a social network in common with the sender or receiver associated with the e-mail address.

In operation, the program code of the confidentiality processor 140 can be enabled upon receiving an electronic message 150 to consult the directory 180 when determining whether or not to conceal a display of a particular e-mail address for a corresponding designated recipient of the electronic message 150. The program code of the confidentiality processor 140 can base the determination upon a privacy preference found in the directory 180 for either the sender of the electronic message 150 or one or more of the designated recipients of the electronic message 150. If a determination is made to conceal an e-mail address, the e-mail address can be placed in the BCC field of the message. Alternatively, to conceal an e-mail address, the e-mail address can be removed entirely from the electronic message 150 and a copy of the electronic message can be separately sent to the concealed e-mail address so as to maintain the confidentiality of the e-mail address.

As an example, a particular e-mail user can set a default privacy setting in the e-mail client that will specify to the confidentiality processor 170 that all outgoing e-mail for that particular e-mail user should not be included in the body of the e-mail if the e-mail is redistributed. Additionally, the author can specify at the time that an e-mail is created that the author's e-mail address should be concealed in the body of the e-mail if the e-mail is eventually redistributed. This can be specified on the author's e-mail client through a user interface. Further, if a recipient receives an e-mail and decides to forward the e-mail, the act of forwarding could prompt the confidentiality processor to scan the e-mail and remove the author's e-mail address from the body of the e-mail. Moreover, rules to govern the concealment process can include prompting the confidentiality processor to conceal an e-mail user's e-mail address if one a certain percentage of the new recipients are not in the author's social network, if the sender is not in the author's social network, or if one or more of the original recipients was specified by the author as not being able to redistribute the author's e-mail address in the body of the e-mail.

Figure 2:
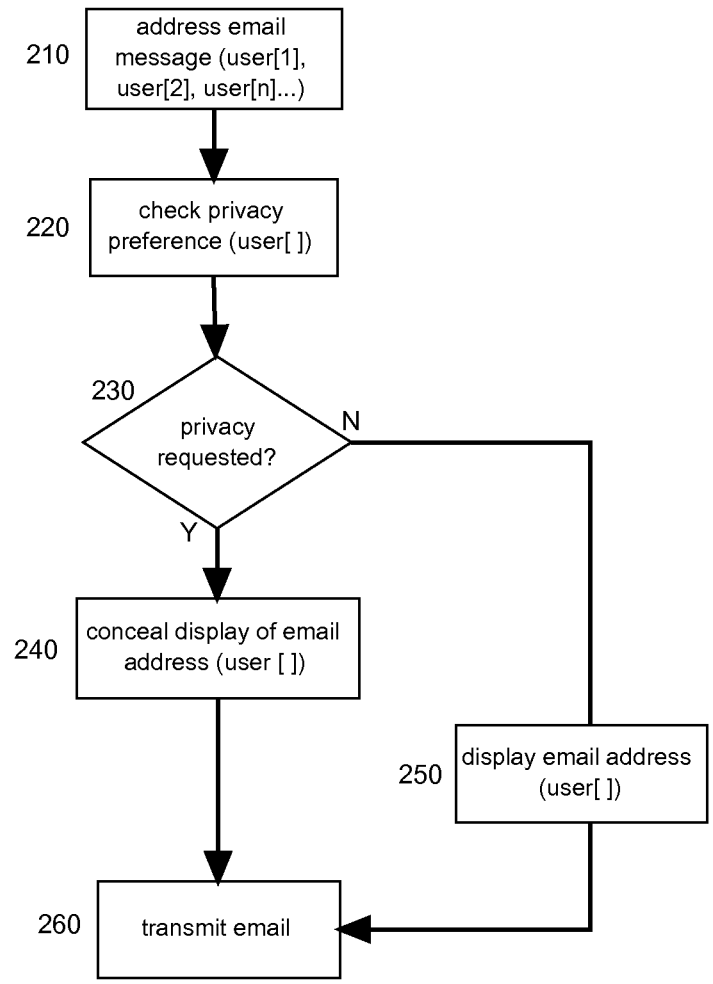
FIG. 2 is a flow chart of a process for managing e-mail address confidentiality in the e-mail messaging data processing system of FIG. 1.

In more general illustration of the process of the invention, FIG. 2 is a flow chart illustrating a process for managing confidentiality of an e-mail user. Beginning in block 210, an e-mail message that has been composed or received from another e-mail user can be addressed to multiple e-mail users (user[1], user[2], user[n] . . . ) for distribution placed in an address field. Next in block 220 each user's privacy preference can be checked and confirmed. In decision block 230 if that particular user's privacy preference is set to private, then in block 240 that particular user's e-mail address can be concealed in a number of ways mentioned in FIG. 1 discussion. If that particular user's privacy preference is set to public, then in block 250 that particular e-mail address can be displayed. Finally in block 260 the e-mail message can be transmitted while preserving the confidentiality of e-mail users that have requested to remain private.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented method, performed within and by a second client computer system, comprising:
   receiving, from a first client computer system, an e-mail message transmitted to a plurality of e-mail users having corresponding e-mail addresses;
   determining, by a confidentiality processor coupled to an e-mail messaging client within the second client computer system, whether or not to cause display of an email address associated with a particular one of the plurality of e-mail users; and
   displaying, by the e-mail messaging client of the second client computer system, content of the e-mail message without displaying, based upon the determining, the e-mail address associated with the particular one of the plurality of e-mail users, wherein
   the first client computer system is configured to:
     identify a privacy preference, in association with the e-mail message, for the particular one of the e-mail users,
     modify the e-mail message, prior to sending, based upon the privacy preference, and
     send, to the plurality of e-mail users, the modified e-mail message, which is received during the receiving.

2. The method of claim 1, wherein
the privacy preference is based upon a threshold number of the plurality of e-mail users also belonging to a social network of the particular one of the e-mail users.

3. The method of claim 1, wherein
the privacy preference is based upon a threshold number of the plurality of e-mail users appearing in a list.

4. The method of claim 3, wherein
the list is one of
   a lightweight directory access protocol (LDAP) directory, and
   an instant messaging (IM) buddy list.

5. The method of claim 1, wherein
the e-mail message is modified to completely remove the e-mail address associated with the particular one of the plurality of e-mail users, and
a separate e-mail message copied from the e-mail message is sent, in lieu of the e-mail message, to the particular one of the e-mail users.

6. A second client computer system, comprising:
a hardware processor configured to initiate the following executable actions:
   receiving, from a first client computer system, an e-mail message transmitted to a plurality of e-mail users having corresponding e-mail addresses;
   determining, by a confidentiality processor coupled to an e-mail messaging client within the second client computer system, whether or not to cause display of an email address associated with a particular one of the plurality of e-mail users; and
   displaying, by the e-mail messaging client of the second client computer system, content of the e-mail message without displaying, based upon the determining, the e-mail address associated with the particular one of the plurality of e-mail users, wherein
   the first client computer system is configured to:
     identify a privacy preference, in association with the e-mail message, for the particular one of the e-mail users,
     modify the e-mail message, prior to sending, based upon the privacy preference, and send, to the plurality of e-mail users, the modified e-mail message, which is received during the receiving.

7. The second client computer system claim 6, wherein the privacy preference is based upon a threshold number of the plurality of e-mail users also belonging to a social network of the particular one of the e-mail users.

8. The second client computer system claim 6, wherein the privacy preference is based upon a threshold number of the plurality of e-mail users appearing in a list.

9. The second client computer system claim 8, wherein the list is one of
 a lightweight directory access protocol (LDAP) directory, and
 an instant messaging (IM) buddy list.

10. The second client computer system claim 6, wherein the e-mail message is modified to completely remove the e-mail address associated with the particular one of the plurality of e-mail users, and
 a separate e-mail message copied from the e-mail message is sent, in lieu of the e-mail message, to the particular one of the e-mail users.

11. A computer program product, comprising:
 a hardware storage device having stored therein computer readable program code,
 the computer readable program code, which when executed by a second client computer system, causes the second client computer system to perform:
  receiving, from a first client computer system, an e-mail message transmitted to a plurality of e-mail users having corresponding e-mail addresses;
  determining, by a confidentiality processor coupled to an e-mail messaging client within the second client computer system, whether or not to cause display of an email address associated with a particular one of the plurality of e-mail users; and
  displaying, by the e-mail messaging client of the second client computer system, content of the e-mail message without displaying, based upon the determining, the e-mail address associated with the particular one of the plurality of e-mail users, wherein the first client computer system is configured to:
   identify a privacy preference, in association with the e-mail message, for the particular one of the e-mail users,
   modify the e-mail message, prior to sending, based upon the privacy preference, and
   send, to the plurality of e-mail users, the modified e-mail message, which is received during the receiving.

12. The second client computer system claim 11, wherein the privacy preference is based upon a threshold number of the plurality of e-mail users also belonging to a social network of the particular one of the e-mail users.

13. The second client computer system claim 11, wherein the privacy preference is based upon a threshold number of the plurality of e-mail users appearing in a list.

14. The second client computer system claim 13, wherein the list is one of
 a lightweight directory access protocol (LDAP) directory, and
 an instant messaging (IM) buddy list.

15. The second client computer system claim 11, wherein the e-mail message is modified to completely remove the e-mail address associated with the particular one of the plurality of e-mail users, and
 a separate e-mail message copied from the e-mail message is sent, in lieu of the e-mail message, to the particular one of the e-mail users.

\* \* \* \* \*